US010056818B2

(12) United States Patent
Xu et al.

(10) Patent No.: US 10,056,818 B2
(45) Date of Patent: Aug. 21, 2018

(54) SERIES-PARALLEL CONVERTER SYSTEM AND CONTROL METHOD THEREOF

(71) Applicant: Delta Electronics (Shanghai) CO., LTD, Shanghai (CN)

(72) Inventors: Guojin Xu, Shanghai (CN); Guoqiao Shen, Shanghai (CN); Jinfa Zhang, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/657,578

(22) Filed: Jul. 24, 2017

(65) Prior Publication Data

US 2018/0062495 A1    Mar. 1, 2018

(30) Foreign Application Priority Data

Aug. 29, 2016    (CN) .......................... 2016 1 0757074

(51) Int. Cl.
*G05F 1/00*    (2006.01)
*G05F 1/565*    (2006.01)
*H02M 1/00*    (2006.01)

(52) U.S. Cl.
CPC ...... *H02M 1/00* (2013.01); *H02M 2001/0003* (2013.01)

(58) Field of Classification Search
CPC .................. H02M 2001/008; H02M 2001/009
USPC ....... 323/269–272, 274, 275, 284, 285, 303, 323/351
See application file for complete search history.

(56) References Cited

U.S. PATENT DOCUMENTS

| | | | |
|---|---|---|---|
| 2005/0213354 A1* | 9/2005 | Pai ........................ | H02M 3/156 363/21.06 |
| 2006/0044724 A1* | 3/2006 | Ishii ...................... | H02M 3/158 361/90 |
| 2006/0220495 A1* | 10/2006 | Yamaguchi ............ | G03G 15/80 310/318 |
| 2006/0273770 A1* | 12/2006 | Siri ....................... | H02M 3/157 323/272 |
| 2012/0007431 A1* | 1/2012 | Jang ....................... | H02J 4/00 307/82 |
| 2014/0049990 A1* | 2/2014 | Limpaecher ............ | H02M 3/24 363/15 |
| 2015/0236634 A1* | 8/2015 | Han .................... | H02K 11/0073 318/504 |

* cited by examiner

*Primary Examiner* — Gary Nash
(74) *Attorney, Agent, or Firm* — Yunling Ren

(57) ABSTRACT

A series-parallel converter system includes: a first set of parallel circuitries including a plurality of first circuitries in parallel with each other; a second set of parallel circuitries including a plurality of second circuits in parallel with each other, the second circuit being controlled in a second control method; wherein an input end of the first set of parallel circuitries and an input end of the second set of parallel circuitries are connected in series with an input power supply; and wherein the first circuitry in the first set of parallel circuitries includes: a first circuit being controlled in a first control method; and a first control circuitry electrically connected with the first circuit and configured to generate a first control signal for controlling the first circuit based on a variable intercept compensation, and an input voltage, a first output current and a virtual impedance of the first circuit.

20 Claims, 8 Drawing Sheets

SERIES-PARALLEL CONVERTER SYSTEM AND CONTROL METHOD THEREOF

CROSS REFERENCE

This application is based upon and claims priority to Chinese Patent Application No. 201610757074.9, filed on Aug. 29, 2016, the entire contents thereof are incorporated herein by reference.

TECHNICAL FIELD

The disclosure relates to power electronic technical field and, particularly, to a series-parallel converter system and a control method thereof.

BACKGROUND

With the development and progress of electronic technology, power electronic systems tend to become integrated and digital. Series-parallel converter system is system-level integration and, by means of series and parallel of standardized modules, configured to achieve functions for different applications. At present, the technical difficulty of series-parallel converter system lies in voltage and current sharing, and it is relatively difficult to deal with current sharing while there is precision requirement for input/output voltage sharing. Accordingly, an outer current sharing loop or a conventional droop characteristic current sharing control is commonly adopted.

When the outer current sharing loop is adopted, an additional control loop is needed. The bandwidth of the control loop is affected greatly by the communication delay. When the power conversion is digitized, the communication delay will affect the control performance of the converter (including dynamic performance, system response speed, etc.). Thus, the current share is relatively slow with poor effect of dynamic current sharing and is susceptible to interference of ambient noise. When the system is relatively complex and there is multiple loop control, the part of current sharing loop is to be kept as simply as possible. Additional design of the current sharing loop, however, may increase the complexity of the system. On the other hand, in the case of hot-swap, the lack of converter data acquisition may cause disorder to update of communication control parameter.

Conventional droop characteristic current sharing control can realize wireless autonomous current sharing, so as to avoid the problem of wired current sharing, but the introduction of control deviation on the input voltage may lead to poor efficiency of voltage regulation and poor precision of voltage sharing.

As the conventional droop characteristic current sharing control is adopted, FIG. 1 illustrates a droop characteristic curve corresponding to the input voltage control of two parallel converters. A virtual impedance coefficient R is indicative of a drooping speed of the input voltage $V_{INi}$ of the i-th parallel converter with the increase of the output current $I_O$. Herein, the input voltage is as shown in equation (1) below:

$$V_{INi} = -R \cdot Io + \frac{1}{2}V_{busi} \qquad (1)$$

wherein $V_{bus}$ is the total input voltage of the system and $\frac{1}{2}V_{busi}$ is the reference voltage of the i-th parallel converter.

As shown in FIG. 1 and equation (1), after introduction of the virtual impedance coefficient R in the i-th parallel converter, a control deviation $\Delta V_{INi}$ of the input voltage is generated at the input voltage $V_{INi}$ of the i-th parallel converter with the increase of the output current $I_O$ of the i-th parallel converter (where i=1, 2 L, n, n∈N), as shown in the following equation (2):

$$\Delta V_{INi} = \frac{1}{2}V_{busi} - V_{INi} = Io \cdot R \qquad (2)$$

It can be seen that the control deviation of the input voltage is generated in the input voltage of the i-th parallel converter due to the virtual impedance coefficient R, and the control deviation increases as the output current $I_O$ of the i-th parallel converter increases. The voltage sharing of the input voltage is thus affected in the series-parallel converter system, and the greater the R, the poorer the sharing effect.

On the other hand, as shown in FIG. 1, when the droop control is performed, $\Delta V_{error}$ between two parallel converters is constant, while the unbalance current $\Delta I$ affecting the current sharing effect becomes smaller as the R increases, as shown in the following equation (3).

$$\Delta I = \Delta V_{error} \cdot \cot\theta = \Delta V_{error}/R \qquad (3)$$

wherein $\Delta I$ is the unbalance current of output currents corresponding to the two parallel converters, $\Delta V_{error}$ is the control deviation of input voltages between the two parallel converters, and θ is an angle between the drooping curve and the horizontal line (supplementary angle corresponding to a slope angle of the drooping curve).

Therefore, as can be seen from the equation (3), a magnitude of the virtual impedance R is associated with that of the unbalanced current $\Delta I$. Increasing the value of R can significantly reduce the unbalanced current, that is, enhance the current sharing effect.

In summary, for a series-parallel system in which the virtual impedance R is introduced, there is a contradiction between the voltage and current sharing control. It is a technical obstacle in the combination of series-parallel converters to improve the control deviation of input voltage while improving accuracy of current sharing through the conventional droop characteristic. So far, there are many shortcomings in the existing technical methods for handling this obstacle.

Therefore, it is an urgent problem to be solved at present to provide a technical solution which can further improve the above-mentioned drawbacks.

SUMMARY

In view of some or all of the problems in the related art, the present disclosure provides a series-parallel converter system and a control method thereof that can improve a control deviation of input voltage introduced by a virtual impedance in conventional droop control.

Additional aspects and advantages of the disclosure will be set forth in part in the description which follows and, in part, will be obvious from the description, or may be learned by practice of the disclosure.

According to an aspect of the disclosure, there is provided a series-parallel converter system, including: a first set of parallel circuitries including a plurality of first circuitries in parallel with each other; a second set of parallel circuitries including a plurality of second circuits in parallel with each other, the second circuit being controlled in a second control method; wherein an input end of the first set of parallel circuitries and an input end of the second set of parallel circuitries are connected in series with an input power supply; and wherein the first circuitry in the first set of parallel circuitries includes: a first circuit being controlled in a first control method; and a first control circuitry electrically connected with the first circuit and configured to generate a first control signal for controlling the first circuit based on a variable intercept compensation, and an input voltage, a first output current and a virtual impedance of the first circuit.

In an exemplary embodiment of the disclosure, the variable intercept compensation is derived from a compensation current and the virtual impedance of the first circuit; and wherein the compensation current is derived from the first output current of the first circuit, or a second output current of the second circuit, or a reference current of the second circuit.

In an exemplary embodiment of the disclosure, the first control circuitry includes: a virtual impedance circuit configured to generate a first voltage signal based on the virtual impedance and the first output current of the first circuit; a variable intercept compensation circuit configured to generate the variable intercept compensation based on the virtual impedance of the first circuit and a compensation current; a reference operation circuit electrically connected with the virtual impedance circuit and the variable intercept compensation circuit, and configured to generate a first reference signal based on the input voltage of the first circuit, the first voltage signal of the virtual impedance circuit and the variable intercept compensation of the variable intercept compensation circuit; and a first regulation circuit electrically connected with the reference operation circuit and the first circuit, and configured to generate the first control signal based on the first reference signal of the reference operation circuit and the first output current of the first circuit.

In an exemplary embodiment of the disclosure, the reference operation circuit includes: a first comparison circuit electrically connected with the virtual impedance circuit and the variable intercept compensation circuit, and configured to generate a third reference signal based on a second reference signal, the variable intercept compensation and the first voltage signal; and a second regulation circuit electrically connected with the first comparison circuit and the first regulation circuit, and configured to generate the first reference signal based on the third reference signal and the input voltage of the first circuit.

In an exemplary embodiment of the disclosure, a system controller including a processing circuitry and a communication circuitry, wherein the communication circuitry is in a bi-directional communication with the second circuit and the first circuitry via a communication bus.

In an exemplary embodiment of the disclosure, the communication circuitry is configured to receive the first output current of the first circuit in the first circuitry; and wherein the processing circuitry is configured to obtain the compensation current based on the first output current and input the compensation current to the variable intercept compensation circuit of the first control circuitry via the communication bus.

In an exemplary embodiment of the disclosure, the compensation current is an average current of the first output current corresponding to the first circuits in the plurality of first circuitries.

In an exemplary embodiment of the disclosure, the communication circuitry is configured to receive a second output current of the second circuit; and wherein the processing circuitry is configured to obtain the compensation current based on the second output current and input the compensation current to the variable intercept compensation circuit of the first control circuitry in the first circuitry via the communication bus.

In an exemplary embodiment of the disclosure, the compensation current is an average current of the second output current corresponding to the plurality of second circuits.

In an exemplary embodiment of the disclosure, the second set of parallel circuitries further includes: a second control circuitry electrically connected with the second circuit and configured to generate a second control signal for controlling the second circuit based on a reference current and a second output current of the second circuit.

In an exemplary embodiment of the disclosure, it further includes: a system controller configured to communicate with the second set of parallel circuitries and the first set of parallel circuitries via a communication bus; wherein the system controller is further configured to input the reference current, via the communication bus, to the second control circuitry and the variable intercept compensation circuit of the first control circuitry in the first set of parallel circuitries, respectively, and the reference current serving as the compensation current of the variable-intercept compensation circuit.

In an exemplary embodiment of the disclosure, the second control method is performed based on current control or power control.

In an exemplary embodiment of the disclosure, the first control method is performed based on input voltage control.

According to an aspect of the disclosure, there is provided a method for controlling a series-parallel converter system, including: providing the series-parallel converter system including: a first set of parallel circuitries including a plurality of first circuitries in parallel with each other, wherein the first circuitry includes a first circuit being controlled in a first control method and a first control circuitry electrically connected with the first circuit; and a second set of parallel circuitries including a plurality of second circuits in parallel with each other, wherein the second circuit is controlled in a second control method; generating a first control signal based on a variable intercept compensation, and an input voltage, a first output current and a virtual impedance of the first circuit; and controlling the first circuit according to the first control signal.

In an exemplary embodiment of the disclosure, it further includes: generating a compensation current based on the first output current, or a second output current of the second circuit, or a reference current of the second circuit; and generating the variable intercept compensation based on the compensation current and the virtual impedance.

In an exemplary embodiment of the disclosure, the generating a first control signal based on a variable intercept compensation, and an input voltage, a first output current and a virtual impedance of the first circuit includes: generating a first voltage signal based on the virtual impedance and the first output current; generating the variable intercept compensation based on a compensation current and the virtual impedance; generating a first reference signal based on the input voltage, the first voltage signal and the variable intercept compensation; and generating the first control signal based on the first reference signal and the first output current.

In an exemplary embodiment of disclosure, the generating a first reference signal based on the input voltage, the first voltage signal and the variable intercept compensation includes: generating a third reference signal based on a second reference signal, the variable intercept compensation and the first voltage signal; and generating the first reference signal based on the third reference signal and the input voltage.

In an exemplary embodiment of the disclosure, the generating a compensation current based on the first output current or a second output current includes: receiving the first output current of the first circuit in the plurality of first circuitries or the second output current of the plurality of second circuits; and deriving an average current, as the compensation current, from the first output current or the second output current.

In an exemplary embodiment of the disclosure, it further includes: generating a second control circuitry based on a second output current of the second circuit and a reference current; and controlling the second circuit according to the second control signal.

In an exemplary embodiment of the disclosure, it further includes: setting the reference current as the compensation current.

According to exemplary embodiments of the disclosure, the variable intercept compensation circuit is introduced into voltage control of parallel converts, such that control deviation of input voltage is improved while ensuring accuracy of current sharing under the conventional droop characteristic and, thus, system performance of voltage sharing can be improved. On the other hand, as the control deviation is reduced through introduction of the virtual impedance, the accuracy of current sharing of the parallel converters can be improved by properly increasing the virtual impedance.

BRIEF DESCRIPTION OF THE DRAWINGS

The above and other features and advantages of the present disclosure will become more apparent by describing in detail exemplary embodiments thereof with reference to the accompanying drawings.

DETAILED DESCRIPTION

Figure 1:
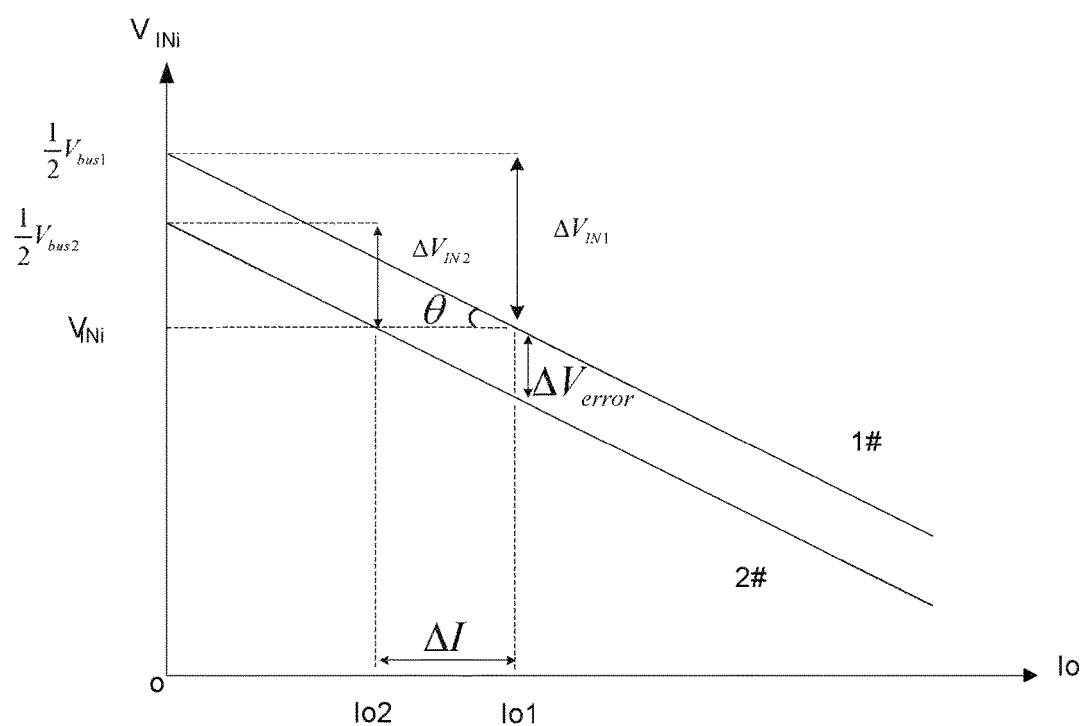
FIG. 1 is a curve graph illustrating a conventional droop characteristic of input voltage control in two parallel converters.

Exemplary embodiments will now be described more fully with reference to the accompanying drawings. However, the exemplary embodiments can be embodied in many forms and should not be construed as limited to the embodiments set forth herein; rather, these embodiments are provided so that this disclosure will be made thorough and complete, and the concept of exemplary embodiments will be fully conveyed to those skilled in the art. Thicknesses of any region or layer are exaggerated in the drawings for purpose of clarity. Same or similar structures are denoted by same reference numbers in the drawings and, thus, a detailed description thereof will be omitted.

Furthermore, the described features, structures, or characteristics may be combined in any suitable manner in one or more embodiments. In the following description, numerous specific details are provided to provide a thorough understanding of the embodiments of the disclosure. Those skilled in the art will recognize, however, that the technical solution of the present disclosure may be practiced without one or more of the specific details described, or that other methods, components, materials, etc. may be employed. In other instances, well-known structures, materials, or operations are not shown or described in detail to avoid obscuring aspects of the disclosure.

Figure 2:
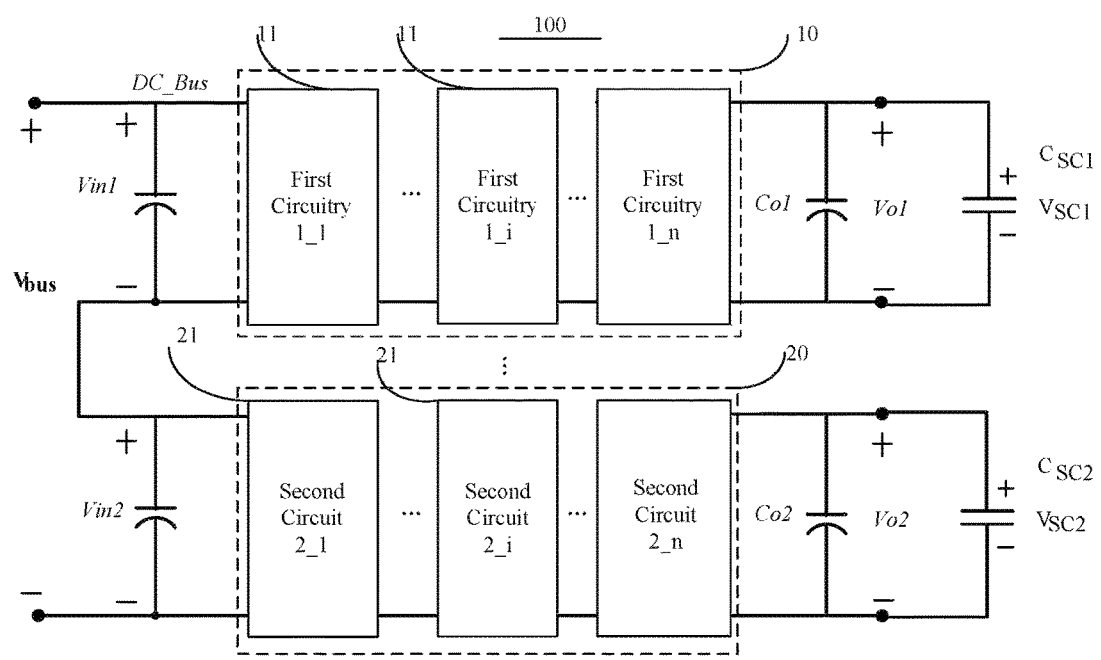
FIG. 2 is a block diagram illustrating a series-parallel converter system according to an exemplary embodiment of the disclosure.
Figure 3:
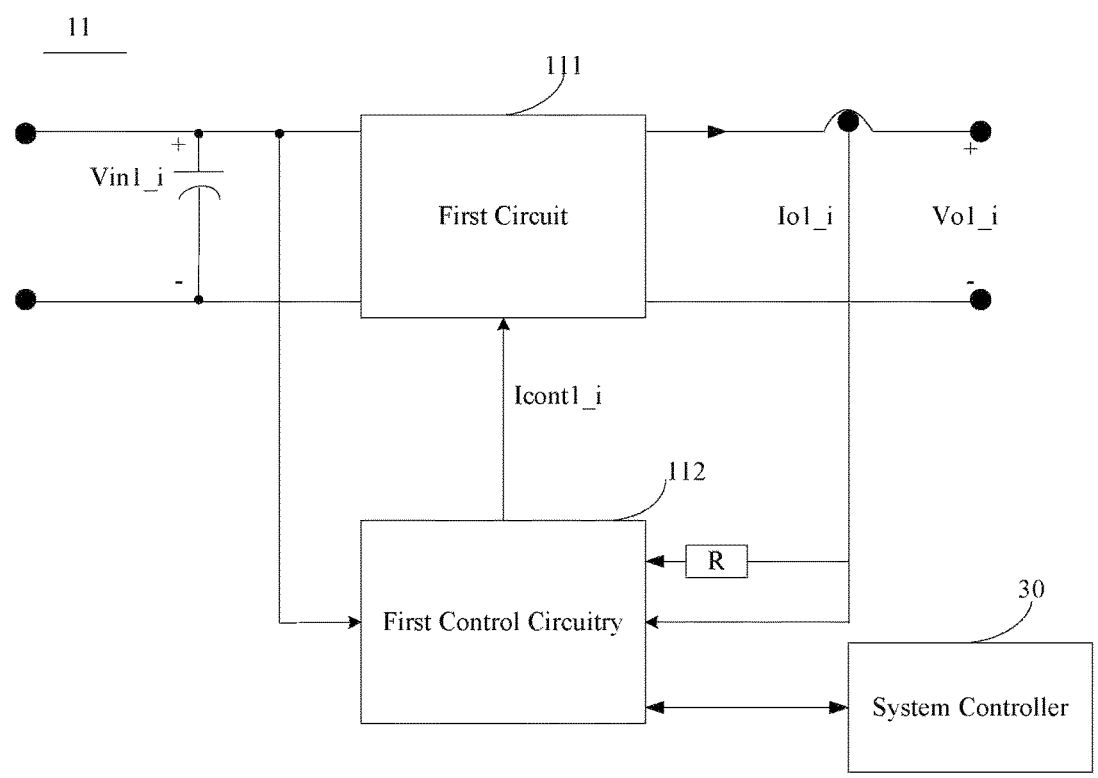
FIG. 3 is a block diagram illustrating a first circuitry in the series-parallel converter system according to an exemplary embodiment of the disclosure.
Figure 4:
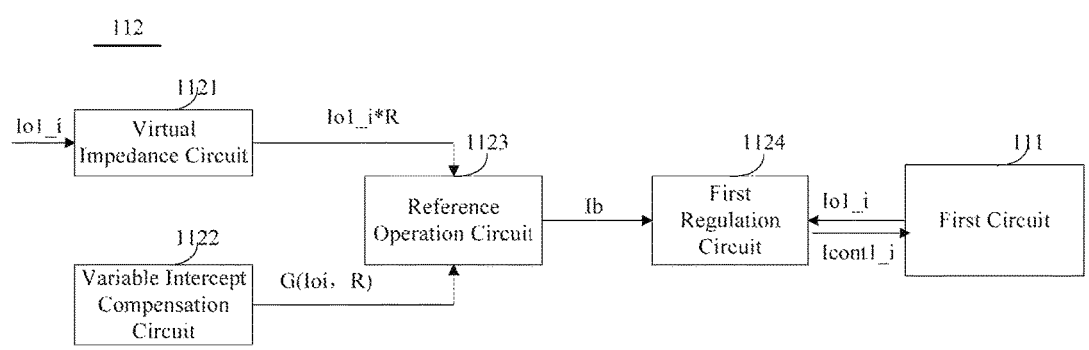
FIG. 4 is a block diagram illustrating a first control circuitry of the first circuitry in the series-parallel converter system according to an exemplary embodiment of the disclosure.

Reference will now be made to FIGS. 2-4 together. FIG. 2 is a block diagram illustrating a series-parallel converter system according to an exemplary embodiment of the disclosure, FIG. 3 is a block diagram illustrating a first circuitry in the series-parallel converter system according to an exemplary embodiment of the disclosure. FIG. 4 is a block diagram illustrating a first control circuitry of the first circuitry.

There is requirement on accuracy of input/output voltage sharing of the series-parallel converter system in many occasions. As shown in FIG. 2, the serial-parallel converter system 100 includes: a first set of parallel circuitries 10 including a plurality of first circuitries 11 (first circuitry 1_1, first circuitry 1_2, . . . , first circuitry 1_i, . . . , first circuitry 1_n, wherein i=1, 2, 3, . . . , n∈N) connected in parallel with each other; a second set of parallel circuitries 20 including a plurality of second circuits 21 (second circuit 2_1, second circuit 2_2, . . . , second circuitry 2_i, . . . , second circuitry 2_n) connected in parallel with each other, and the second circuit 21 is controlled in a second control method. In an embodiment, an input end of the first set of parallel circuitries 10 and an input end of the second set of parallel circuitries 20 are connected in series with an input power supply (e.g. $V_{bus}$).

In an embodiment, each of the first circuitries 11 in the first set of parallel circuitries 10 has a power input end and a power output end, and the first circuitries 11 are connected with each other through their power input ends and power output ends, respectively, to form a parallel architecture. The input ends of the respective first circuitries 11 are connected in parallel with each other and provided with an input voltage Vin1, while the output ends of the respective first circuitries 11 are connected in parallel with a load (e.g., a capacitor Co1) and represent an output voltage Vo1.

In an embodiment, the input ends of the respective second circuitries 21 in the second set of parallel circuitries 20 are connected in parallel with each other and provided with an input voltage Vin2, while the output ends of the respective second circuitries are connected in parallel with a load (e.g., a capacitor Co1) and represent an output voltage Vo2.

The i-th first circuitry 1_i in the first set of parallel circuitries 10 will be described as an example. The first circuitry 1_1, the first circuitry 1_2, and the like may have the same structure as it.

As shown in FIG. 3, the i-th first circuitry 1_i, that is, the first circuitry 11 includes: a first circuit 111, which is controlled in a first control method; a first control circuitry 112, which is electrically connected with the first circuit 111 and configured to generate a first control signal Icont1_i based on a variable intercept compensation G(Ioi, R), and an input voltage Vin1_i a first output current Io1_i and a virtual impedance R of the first circuit 111 for controlling the first circuit 111.

In an exemplary embodiment, the second control method is performed based on current or power control.

In an exemplary embodiment, the first control method is performed based on input voltage control.

In an exemplary embodiment, at least one of the first circuit and the second circuit is a power converter connected between input and output of a power supply. The power converter includes a control end, which is connected with the output end of the first control circuitry 112. Theoretically, each of the first circuits 111 and each of the second circuits 21 should meet the requirements of the same voltage, the same current, and the same output impedance. However, there is always difference between the preset value and the actual value, which may affect the current sharing of the series-parallel converter system.

In an exemplary embodiment, the power converter may be an AC-to-DC converter (AC/DC), which applied in the occasion that input power source is AC. In another exemplary embodiment, the power converter is a DC-to-DC converter (DC/DC), which applied in the occasion that the input power source is a DC voltage source.

It should be noted that, although there are only two sets of parallel circuitries in the series-parallel converter system 100 as described above, the system 100 may include m (m is a positive integer equal to or greater than 2) sets of parallel circuitries in an actual system in the in and sets of parallel circuitries, there may be at least one set of parallel circuitry being controlled by input voltage and at least one set of parallel circuitry being controlled by current or power. The configuration of the first circuitry 11 in the embodiment of the disclosure and the control method thereof are applicable to all parallel circuitries using the input voltage control. The following embodiments are illustrated by the example in which the system 100 includes two sets of parallel circuitries.

In an exemplary embodiment of the disclosure, the variable intercept compensation G(Ioi, R) is obtained based on a compensation current Icom and the virtual impedance R of the first circuit 111. Herein, the compensation current Icom may be determined according to the first output current Io1_i of the first circuit 111, a second output current Io2_i of the second circuit 21, or a reference current Iref of the second circuit 21.

As shown in FIG. 4, the first control circuitry 112 includes: a virtual impedance circuit 1121, which is configured to generate a first voltage signal based on the virtual impedance R and the first output current Io1_i of the first circuit 111; a variable intercept compensation circuit 1122, which is configured to generate the variable intercept compensation G(Ioi, R) based on the virtual impedance R and a compensation current Icom of the first circuit 111; a reference operation circuit 1123, which is electrically connected with the virtual impedance circuit 1121 and the variable intercept compensation circuit 1122, and configured to generate a first reference signal Ib based on the input voltage Vin1_i (e.g., it may be a sampling voltage Vfb of the input voltage Vin1_i) of the first circuit 111, the first voltage signal to Io1_i*R of the virtual impedance circuit 1121 and the variable intercept compensation G(Ioi, R) of the variable intercept compensation circuit 1122; and a first regulation circuit 1124, which is electrically connected with the reference operation circuit 1123 and the first circuit 111, and configured to generate the first control signal Icont1_i based on the first reference signal Ib of the reference operation circuit 1123 and the first output current Io1_i of the first circuit 111.

In the exemplary embodiment, the reference operation circuit 1123 includes: a first comparison circuit, which is electrically connected with the virtual impedance circuit 1121 and the variable intercept compensation circuit 1122, and configured to generate a third reference signal Vb based on a second reference signal (e.g., it may be a reference voltage Vref), the variable intercept compensation G(Ioi, R) and the first voltage signal Io1_i*R; and a second regulation circuit, which is electrically connected with the first comparison circuit and the first regulation circuit 1124, and configured to generate the first reference signal Ib based on the third reference signal Vb and the input voltage Vin1_i of the first circuit 111.

Figure 6:
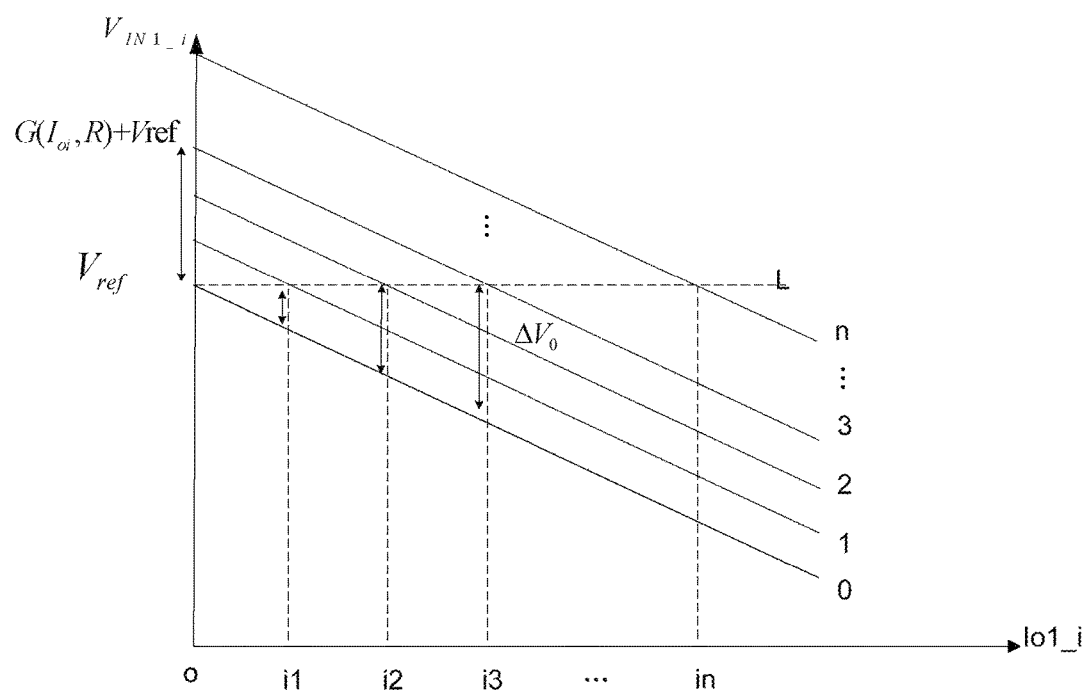
FIG. 6 is a curve graph illustrating a droop characteristic of input voltage control in two parallel converters corresponding to a series-parallel converter system according to an exemplary embodiment of the disclosure.

FIG. 6 is a curve graph illustrating a droop characteristic of input when the variable intercept compensation circuit 1122 is introduced into the i-th first circuitry 1_i of the first set of parallel circuitries. As shown in FIG. 6, the input voltage of the i-th first circuitry 1_i can be represented by the following equation (4).

$$V_{IN1\_i} = V_{ref} - R \cdot Io1\_i + G(I_{oi}, R)$$

$$(i=1,2,3 \ldots n) \tag{4}$$

The control deviation of the input voltage of the first circuitry 1_i can be represented by the following equation (5).

$$\Delta V_{IN1\_i} = V_{ref} - V_{IN1\_i} = Io1\_i \cdot R - G(I_{oi}, R) \tag{5}$$

As shown in FIG. 6, when the variable intercept compensation circuit 1122 is not introduced, the droop characteristic curve corresponding to the i-th first circuitry 1_i is a slanted line, for example, the solid line 0. After the variable intercept compensation circuit 1122 is introduced, however, the droop characteristic curve corresponding to the i-th first circuitry 1_i is represented by the equation (4). The intercept on the voltage axis (Y axis) corresponding to the zero current varies with the change of the first output current Io1_i The droop characteristic curve of the input voltage of the i-th first circuitry exhibits, with the change of the first output current Io1_i, a trajectory of a cluster of parallel lines on the coordinate system. For example, when the first output current Io1_i is i1, i2, i3, . . . , in, the droop characteristic curve of the input voltage of the i-th first circuitry 1_i is represented by broken lines 1, 2, 3, . . . , n, respectively. Since each output current corresponds to a different variable intercept compensation, and the magnitude of the variable intercept compensation is close to the product of the corresponding first output current and the virtual impedance, the control deviation of input voltage of the i-th first circuitry 1_i as represented by equation (5), will be significantly reduced, so that the input voltage values for the control, which actually correspond to the cluster of parallel lines at different output currents, are in the vicinity of the same horizontal line V=V$_{ref}$, that is, the broken line L.

Referring to FIG. 3, the system 100 further includes a system controller 30 which includes a processing circuitry and a communication circuitry. The communication circuitry is in a bi-directional communication with the second circuit 21 and the first circuitry 11 via a communication bus.

In an exemplary embodiment, the communication circuitry is configured to receive the first output current Io1_i of the first circuit 111 in the first circuitry 11, and the processing circuitry is configured to obtain the compensation current Icom based on the first output current Io1_i and input the compensation current Icom to the variable intercept compensation circuit 1122 of the first control circuitry 112 via the communication bus.

In some embodiments, the compensation current Icom may be an average current Ieven1 of the first output current Io1_i corresponding to the first circuits 111 in the plurality of first circuitries 11. The variable intercept compensation circuit performs multiplication of the average current of the first output current and the virtual impedance R and outputs the operation result to obtain the variable intercept compensation G(Ioi, R).

In an embodiment, the system controller receives the first output current Io1_i of all n first circuitries 11 in the first set of parallel circuitries 10 and obtains the average current Ieven1 of the n first output currents according to the following equation.

$$Ieven1 = \frac{\sum_{i=1}^{n} Io1\_i}{n} \quad (6)$$

It should be noted that, although the above equation is used to obtain an average value from the first output current Io1_i of all n first circuitries 11 in the first set of parallel circuitries 10 as the compensation current of the variable intercept compensation circuit 1122, these data may be subjected to any other arithmetic processing. For example, the maximum and minimum values may be removed from the output currents before averaging the current. The present disclosure is not limited thereto.

In other embodiments, the compensation current Icom may be an RMS (root-mean-square) value, a median value and the like of the first output current Io1_i corresponding to the first circuit 111 in the plurality of first circuitries 11. The present disclosure is not limited thereto.

In other embodiment, the communication circuitry is configured to receive a second output current Io2_i of the second circuit 20; and the processing circuitry is configured to obtain the compensation current Icom based on the second output current Io2_i and input the compensation current Icom to the variable intercept compensation circuit 1122 of the first control circuitry 112 in the first circuitry 11 via the communication bus.

In an embodiment, the compensation current Icom is an average current Ieven2 of the second output current Io2_i corresponding to the second circuits 21.

In an embodiment, the system controller receives the second output current Io2_i of all n second circuits 21 in the second set of parallel circuitries 20 and obtains the average current Ieven2 of the n second output currents according to the following equation.

$$Ieven2 = \frac{\sum_{i=1}^{n} Io2\_i}{n} \quad (7)$$

Similarly, although the above equation is used to obtain an average value from the second output current Io2_i of all n second circuits 21 in the second set of parallel circuitries 20 as the compensation current of the variable intercept compensation circuit 1122, these data may be subjected to any other arithmetic processing. For example, the maximum and minimum values may be removed from the output currents before averaging the current. The present disclosure is not limited thereto.

In other embodiments, the compensation current Icom may be an RMS (root-mean-square) value, a median value and the like of the second output current Io2_i corresponding to the second circuits 21. The present disclosure is not limited thereto.

Figure 7:
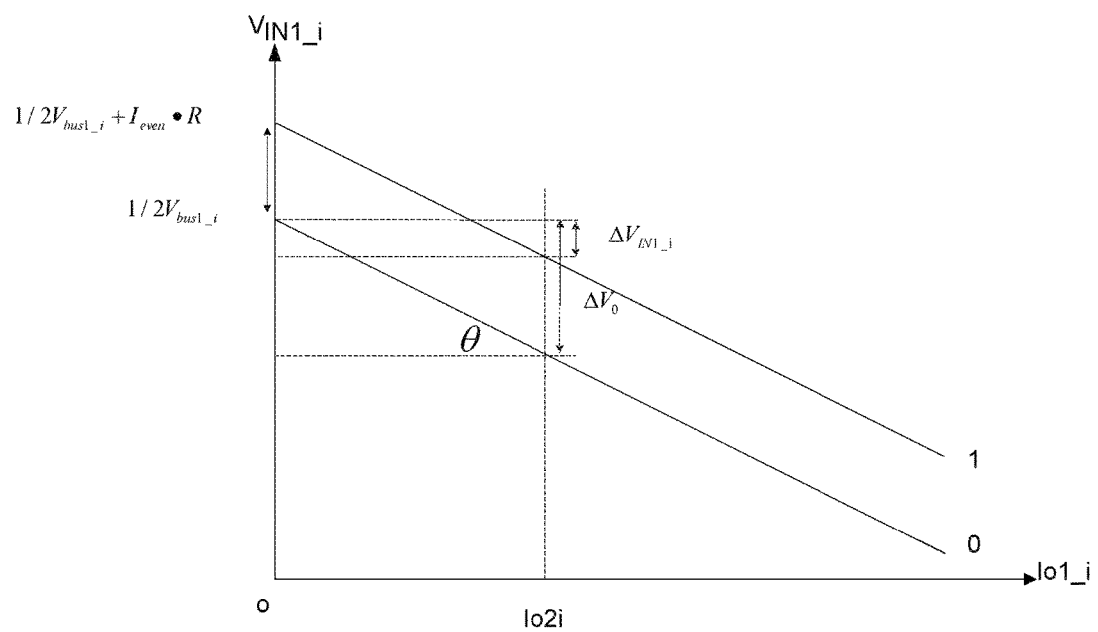
FIG. 7 is a curve graph illustrating a droop characteristic of input voltage control in two parallel converters corresponding to a series-parallel converter system according to another exemplary embodiment of the disclosure.

Taking an example where the average current Ieven1 of the first set of parallel circuitries 10 or the average current Ieven2 of the second set of parallel circuitries 20 (represented by the average current Ieven in FIG. 7 and the following description for convenience) in the system 100 is used as the compensation current Icom of the variable intercept compensation circuit 1122, the droop characteristic curve of the input voltage corresponding to the i-th first circuitry 1_i is as shown in FIG. 7 when the variable intercept compensation circuit 1122 is introduced.

According to the equation (5), the control deviation of input voltage of the first circuitry shown in FIG. 7 may be expressed by the following equation (8).

$$\Delta V_{IN1\_i} = V_{ref} - V_{IN} \quad (8)$$
$$= Io1\_i \cdot R - G(I_{oi}, R)$$
$$= (Io1\_i - Ieven) \cdot R$$

The above equation shows that, with the disclosed system, the control deviation of input voltage introduced by the virtual impedance coefficient R is related only to the output current imbalance, rather than magnitude of the output current, of the n first circuitries 11 in the first set of parallel circuitries 10. The output current imbalance in an actual system $$\left( imbalance = \frac{(Io1\_i - Ieven1)}{Io1\_i} \times 100\% \right)$$

needs to be maintained at about 5%, which means that the voltage drop introduced by the virtual impedance can be reduced to 5% compared to the conventional droop characteristic method. In other words, $\Delta V_{IN1\_i}$ is only 5% of $\Delta V_O$.

In some embodiments, a reference current Iref of the second circuit 21 in the second set of parallel circuitries 20 may also be used as the compensation current Icom of the variable intercept compensation circuit 1122. In the embodiment, the reference current Iref may be transmitted by the system controller 30 to the first set of parallel circuitries 10 and the second set of parallel circuitries 20. This will be described below with reference to FIG. 5.

Figure 5:
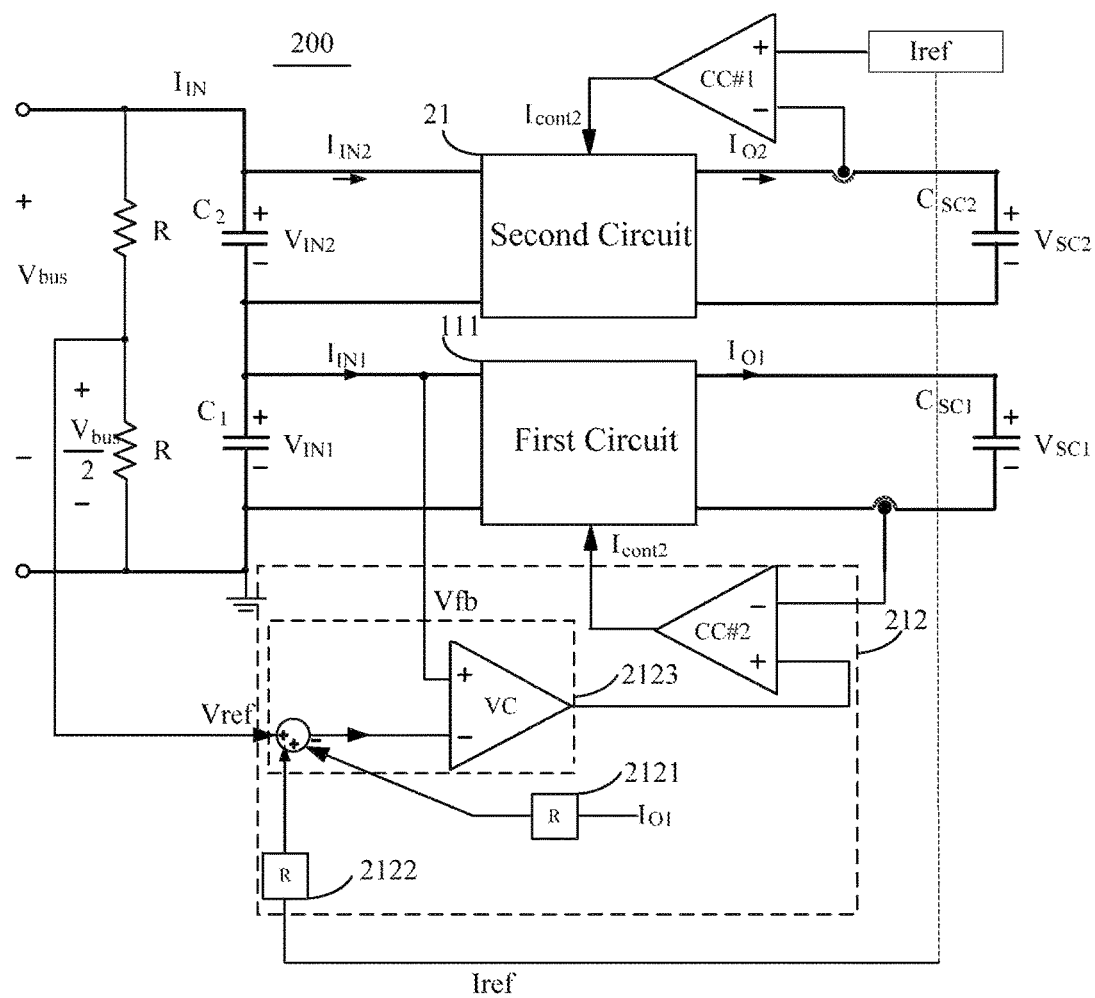
FIG. 5 is a block diagram illustrating a series-parallel converter system according to another exemplary embodiment of the disclosure.

FIG. 5 illustrates an exemplary embodiment of the series-parallel converter system shown by FIG. 2. As shown in FIG. 5, the second set of parallel circuitries 20 includes the second circuits 21 being controlled by current control or power control. The second set of parallel circuitries 20 may further include a second control circuitry CC#1 electrically connected with the second circuit 21 and configured to generate, based on a reference current Iref and a second output current Io2 of the second circuit 21, a second control signal Icont2 for controlling the second circuit 21.

In an embodiment, the second control circuitry CC#1 of the second set of parallel circuitries 20 may be implemented as a current regulator of PI (proportional integral controller) or PID (Proportion Integration Differentiation) with two parameter inputs and one output.

The first set of parallel circuitries 10 includes a plurality of first circuitries 11 in parallel with each other. The first circuitry 11 may include a first circuit 111 and a first control circuitry 212 and the first circuit 111 is controlled with an input voltage. In an embodiment, the first control circuitry 212 includes a virtual impedance circuit 2121, a variable intercept compensation circuit 2122, a reference operation circuit 2123, and a first regulation circuit CC#2. Herein, the reference operation circuit 2123 may include a first comparison circuit and a second regulation circuit VC.

Herein, the system may further include a system controller (not shown), which is configured to issue instructions and input a reference current Iref to a parameter input end of the second control circuitry CC#1 of the second set of parallel circuitries. The other parameter input end of the second control circuitry CC#1 is configured to receive the output current Io2 of the second circuit 21 and generate a second control signal Icont2 based on the reference current Iref and the second output current Io2 of the second circuit 21 to control the second circuit 21.

In the embodiment, the system controller inputs the reference current Iref to an input end of the first control circuitry 212 of the first set of parallel circuitries 10 and generates the variable intercept compensation G(Ioi, R) based on the virtual impedance R of the first circuit 111. The first output current Io1 of the first circuit 111 is input to the input end of the virtual impedance circuit 2121, and is multiplied by the virtual impedance R of the first circuit 111. The variable intercept compensation G(Ioi, R) output from the variable intercept compensation circuit 2122, the reference voltage Vref, and the output value Io1*R of the virtual impedance circuit 2121 are input to three input ends of the first comparison circuit, respectively, and the first comparison circuit may be configured to operate the addition between the variable intercept compensation and the reference voltage as well as the subtraction between the variable intercept compensation and the output values Io1*R of the virtual impedance circuit 2121 by means of comparators. An output end of the first comparison circuit is connected with a parameter input end of the second regulation circuit VC, while the other parameter input end of the second regulation circuit VC is connected with the input voltage $V_{IN1}$ of the first circuit 111. A sampled feedback value Vfb of the input voltage $V_{IN1}$ is inputted to generate an output signal to a parameter input end of the first regulation circuit CC#2. The other parameter input end of the first regulation circuit CC#2 is connected to the output current Io1 of the first circuit 111, such that the first control signal Icont1 is generated based on the data from the both input ends to control the first circuit 111.

The sampled feedback value Vfb of the input voltage $V_{IN1}$ of the first circuit 111 is added to the output Iref*R of the variable intercept compensation circuit 2122, and the product of the output current signal Io2 and the virtual impedance R is subtracted, and then the reference voltage Vref is subtracted. The operation result is outputted through the first regulation circuit CC#2 to generate the first control signal Icont1, which is used to control the operation of the power converter of the first circuit 111.

In an embodiment, the second regulation circuit VC of the first control circuitry 212 may be implemented as a voltage regulator of PI or PID. The first regulation circuit CC#2 of the first control circuitry 212 may be implemented as a PI or PID current regulator.

The control scheme shown in FIG. 5 utilizes the reference current Iref of the second set of parallel circuitries 20 as the compensation current Icom for the first set of parallel circuitries 10. Since the number of parallel converters in the first and second sets of parallel connected circuitries 10 and 20 of the series-parallel converter system 200 is the same, and the voltage variable ratio thereof is close to each other, the average current value or the total current is substantially equal to each other. In other words, the reference current of the second set of parallel circuitries 20 is close to the average current value of the first set of parallel circuitries 10. Therefore, the control deviation (Io−Iref)*R of the input voltage introduced by the virtual impedance is about 5% of the original one (Io*R), so the effect on the voltage sharing value of the two sets of parallel circuitries in FIG. 5 is small and, thus, voltage sharing performance of the system is guaranteed. On the other hand, since the control deviation introduced by the virtual impedance is reduced, it is possible to improve the current sharing accuracy of the parallel converter using the input voltage control by appropriately increasing the virtual impedance R.

According to the serial-parallel converter system provided by the embodiments of the disclosure, a contradiction between the effect of current sharing and the accuracy of voltage sharing existed in parallel converters of the series-parallel converter system can be solved by introducing the variable intercepting compensation circuit in the voltage control loop of the droop characteristic control method.

Figure 8:
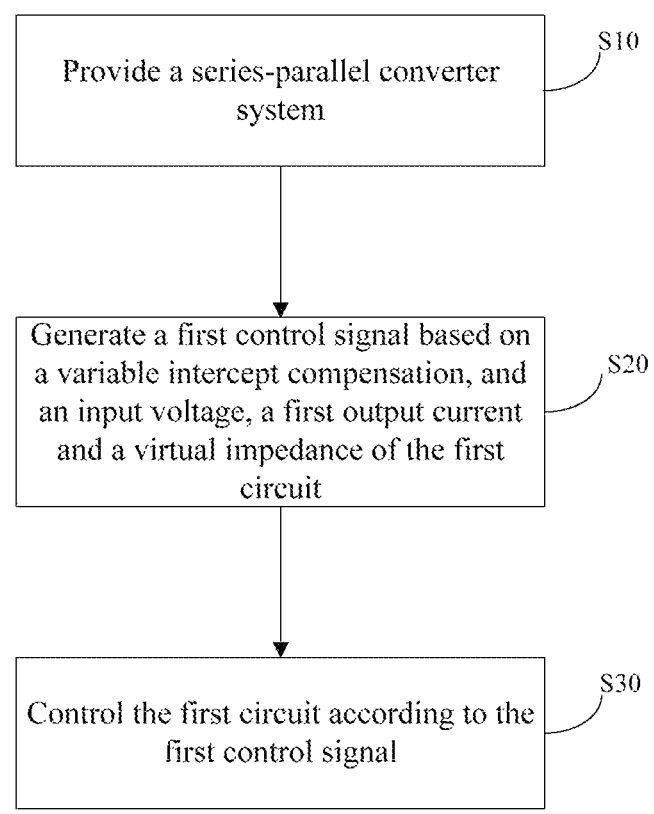
FIG. 8 is a flow chart illustrating a method for controlling a series-parallel converter system according to an exemplary embodiment of the disclosure.

FIG. 8 is a flow chart illustrating a method for controlling a series-parallel converter system according to an exemplary embodiment of the disclosure.

As shown in FIG. 8, the method includes following steps. In step S10, a series-parallel converter system is provided. The series-parallel converter system may include: a first set of parallel circuitries including a plurality of first circuitries in parallel with each other, wherein the first circuitry includes a first circuit being controlled in a first control method and a first control circuitry electrically connected with the first circuit; and a second set of parallel circuitries including a plurality of second circuits in parallel with each other, wherein the second circuit is controlled in a second control method.

In step S20, a first control signal is generated based on a variable intercept compensation, and an input voltage, a first output current and a virtual impedance of the first circuit.

In an exemplary embodiment, the method further includes: a compensation current is generated based on the first output current, a second output current of the second circuit, or a reference current of the second circuit; and the variable intercept compensation is generated based on the compensation current and the virtual impedance.

In an exemplary embodiment, the first control signal is generated based on the variable intercept compensation, and the input voltage, the first output current and the virtual impedance of the first circuit by: generating a first voltage signal based on the virtual impedance and the first output current; generating the variable intercept compensation based on a compensation current and the virtual impedance; generating a first reference signal based on the input voltage, the first voltage signal and the variable intercept compensation; and generating the first control signal based on the first reference signal and the first output current.

In an exemplary embodiment, the first reference signal is generated based on the input voltage, the first voltage signal and the variable intercept compensation by: generating a third reference signal based on a second reference signal, the variable intercept compensation and the first voltage signal; and generating the first reference signal based on the third reference signal and the input voltage.

In an exemplary embodiment, the compensation current is generated based on the first output current or the second output current by: receiving the first output current of the first circuit in the plurality of first circuitries or the second output current of the plurality of second circuits; and deriving an average current, as the compensation current, from the first output current or the second output current.

In an exemplary embodiment, the method further includes: a second control circuitry is generated based on a second output current of the second circuit and a reference current; and controlling the second circuit according to the second control signal.

In an exemplary embodiment, the method further includes: the reference current is used as the compensation current.

In step S30, the first circuit is controlled according to the first control signal.

With respect to the control method in the above-described exemplary embodiments, the concrete manner in which the operation is performed in each step has been described in detail in the exemplary embodiment relating to the series-parallel converter system, and will not be elaborated herein.

According to the serial-parallel converter system and the control method thereof, the variable-intercept compensation circuit is introduced, such that, when the virtual impedance R is constant, the current sharing effect of the parallel converter is not changed, and the R value can be appropriately increased to improve the current sharing effect since the control deviation of input voltage is reduced. On the other hand, as the parallel converters adopts droop characteristic curve with introduction of the variable intercept compensation circuit, the control deviation of input voltage is effectively reduced with almost no influence on the voltage sharing of input voltage and output load, such that a long-term stable operation of the series-parallel converter is supported.

The present disclosure has been described with respect to the above related embodiments. However, the above-described embodiments are merely examples for carrying out the present disclosure. It is to be noted that the disclosed embodiments do not limit the scope of the present disclosure. On the contrary, modifications and variations that fall within the spirit and scope of the present disclosure are within the scope of the presently disclosed patent.

What is claimed is:

1. A series-parallel converter system, comprising:
a first set of parallel circuitries comprising a plurality of first circuitries in parallel with each other;
a second set of parallel circuitries comprising a plurality of second circuits in parallel with each other, the second circuit being controlled in a second control method;
wherein an input end of the first set of parallel circuitries and an input end of the second set of parallel circuitries are connected in series with an input power supply; and
wherein the first circuitry in the first set of parallel circuitries comprises:
a first circuit being controlled in a first control method; and
a first control circuitry electrically connected with the first circuit and configured to generate a first control signal for controlling the first circuit based on a variable intercept compensation, and an input voltage, a first output current and a virtual impedance of the first circuit.

2. The system according to claim 1, wherein the variable intercept compensation is derived from a compensation current and the virtual impedance of the first circuit; and
wherein the compensation current is derived from the first output current of the first circuit, or a second output current of the second circuit, or a reference current of the second circuit.

3. The system according to claim 1, wherein the first control circuitry comprises:
a virtual impedance circuit configured to generate a first voltage signal based on the virtual impedance and the first output current of the first circuit;
a variable intercept compensation circuit configured to generate the variable intercept compensation based on the virtual impedance of the first circuit and a compensation current;
a reference operation circuit electrically connected with the virtual impedance circuit and the variable intercept compensation circuit, and configured to generate a first reference signal based on the input voltage of the first circuit, the first voltage signal of the virtual impedance circuit and the variable intercept compensation of the variable intercept compensation circuit; and
a first regulation circuit electrically connected with the reference operation circuit and the first circuit, and configured to generate the first control signal based on the first reference signal of the reference operation circuit and the first output current of the first circuit.

4. The system according to claim 3, wherein the reference operation circuit comprises:
a first comparison circuit electrically connected with the virtual impedance circuit and the variable intercept compensation circuit, and configured to generate a third reference signal based on a second reference signal, the variable intercept compensation and the first voltage signal; and
a second regulation circuit electrically connected with the first comparison circuit and the first regulation circuit, and configured to generate the first reference signal based on the third reference signal and the input voltage of the first circuit.

5. The system according to claim 3, further comprising:
a system controller comprising a processing circuitry and a communication circuitry, wherein the communication circuitry is in a bi-directional communication with the second circuit and the first circuitry via a communication bus.

6. The system according to claim 5, wherein the communication circuitry is configured to receive the first output current of the first circuit in the first circuitry; and
wherein the processing circuitry is configured to obtain the compensation current based on the first output current and input the compensation current to the variable intercept compensation circuit of the first control circuitry via the communication bus.

7. The system according to claim 6, wherein the compensation current is an average current of the first output current corresponding to the first circuits in the plurality of first circuitries.

8. The system according to claim 5, wherein the communication circuitry is configured to receive a second output current of the second circuit; and
wherein the processing circuitry is configured to obtain e compensation current based on the second output current and input the compensation current to the variable intercept compensation circuit of the first control circuitry in the first circuitry via the communication bus.

9. The system according to claim 8, wherein the compensation current is an average current of the second output current corresponding to the plurality of second circuits.

10. The system according to claim 3, wherein the second set of parallel circuitries further comprises:
a second control circuitry electrically connected with the second circuit and configured to generate a second control signal for controlling the second circuit based on a reference current and a second output current of the second circuit.

11. The system according to claim 10, further comprising:
a system controller configured to communicate with the second set of parallel circuitries and the first set of parallel circuitries via a communication bus;
wherein the system controller is further configured to input the reference current, via the communication bus, to the second control circuitry and the variable intercept compensation circuit of the first control circuitry in the first set of parallel circuitries, respectively, and the reference current serving as the compensation current of the variable-intercept compensation circuit.

12. The system according to claim 1, wherein the second control method is performed based on current control or power control.

13. The system according to claim 1, wherein the first control method is performed based on input voltage control.

14. A method for controlling a series-parallel converter system, comprising:
providing the series-parallel converter system comprising: a first set of parallel circuitries comprising a plurality of first circuitries in parallel with each other, wherein the first circuitry comprises a first circuit being controlled in a first control method and a first control circuitry electrically connected with the first circuit; and a second set of parallel circuitries comprising a plurality of second circuits in parallel with each other, wherein the second circuit is controlled in a second control method;
generating a first control signal based on a variable intercept compensation, and an input voltage, a first output current and a virtual impedance of the first circuit; and
controlling the first circuit according to the first control signal.

15. The method according to claim 14, further comprising:
generating a compensation current based on the first output current, or a second output current of the second circuit, or a reference current of the second circuit; and
generating the variable intercept compensation based on the compensation current and the virtual impedance.

16. The method according to claim 14, wherein the generating a first control signal based on a variable intercept compensation, and an input voltage, a first output current and a virtual impedance of the first circuit comprises:
generating a first voltage signal based on the virtual impedance and the first output current;
generating the variable intercept compensation based on a compensation current and the virtual impedance;
generating a first reference signal based on the input voltage, the first voltage signal and the variable intercept compensation; and
generating the first control signal based on the first reference signal and the first output current.

17. The method according to claim 16, wherein the generating a first reference signal based on the input voltage, the first voltage signal and the variable intercept compensation comprises:
generating a third reference signal based on a second reference signal, the variable intercept compensation and the first voltage signal; and
generating the first reference signal based on the third reference signal and the input voltage.

18. The method according to claim 15, wherein the generating a compensation current based on the first output current or a second output current comprises:
receiving the first output current of the first circuit in the plurality of first circuitries or the second output current of the plurality of second circuits; and
deriving an average current, as the compensation current, from the first output current or the second output current.

19. The method according to claim 16, further comprising:
generating a second control circuitry based on a second output current of the second circuit and a reference current; and
controlling the second circuit according to the second control signal.

20. The method according to claim 19, further comprising:
setting the reference current as the compensation current.

* * * * *